US009504010B2

(12) United States Patent
Lebreton et al.

(10) Patent No.: US 9,504,010 B2
(45) Date of Patent: Nov. 22, 2016

(54) PAGING READING CONFLICT MANAGEMENT IN DUAL STANDBY HANDSETS

(75) Inventors: Olivier Lebreton, Saint Mars Doutille (FR); Jerome Durand, Le Mans (FR)

(73) Assignee: ST-ERICSSON SA, Plan-les-Ouates (CH)

( * ) Notice: Subject to any disclaimer, the term of this patent is extended or adjusted under 35 U.S.C. 154(b) by 920 days.

(21) Appl. No.: 13/822,106

(22) PCT Filed: Sep. 16, 2011

(86) PCT No.: PCT/EP2011/066122
§ 371 (c)(1),
(2), (4) Date: May 6, 2013

(87) PCT Pub. No.: WO2012/035144
PCT Pub. Date: Mar. 22, 2012

(65) Prior Publication Data
US 2013/0225211 A1    Aug. 29, 2013

Related U.S. Application Data

(60) Provisional application No. 61/411,704, filed on Nov. 9, 2010.

(30) Foreign Application Priority Data

Sep. 17, 2010   (EP) ..................................... 10177292
Oct. 14, 2010   (EP) ..................................... 10306118

(51) Int. Cl.
*H04W 68/00*   (2009.01)
*H04W 68/02*   (2009.01)
*H04W 48/18*   (2009.01)
*H04W 68/12*   (2009.01)

(52) U.S. Cl.
CPC ............. *H04W 68/02* (2013.01); *H04W 48/18* (2013.01); *H04W 68/12* (2013.01)

(58) Field of Classification Search
CPC ... H04W 68/02; H04W 48/18; H04W 68/12; H04W 88/06; H04W 76/048
USPC .............................................. 455/458, 552.1
See application file for complete search history.

(56) References Cited

U.S. PATENT DOCUMENTS

| 2003/0125073 | A1* | 7/2003 | Tsai | H04W 68/02 455/552.1 |
| 2009/0215472 | A1* | 8/2009 | Hsu | G06K 19/0701 455/458 |
| 2009/0215473 | A1* | 8/2009 | Hsu | G06K 19/0701 455/458 |

FOREIGN PATENT DOCUMENTS

| CN | 101217747 A | 7/2008 |
| EP | 1 940 122 A2 | 7/2008 |

OTHER PUBLICATIONS

International Search Report issued in corresponding International application No. PCT/EP2011/066122, date of mailing Oct. 17, 2011.
Written Opinion of the International Searching Authority issued in corresponding International application No. PCT/EP2011/066122, date of mailing Oct. 17, 2011.

* cited by examiner

*Primary Examiner* — Marcus Hammonds
(74) *Attorney, Agent, or Firm* — Patent Portfolio Builders PLLC

(57) ABSTRACT

A wireless communication apparatus, which is configured to receive and transmit data via cells of at least two network cell belonging different networks, selects one of the networks to listen to in case of conflict. The apparatus has a radio transceiver module and a processor. The processor includes a driver of the radio transceiver module to choose one network that the radio transceiver module should listen to, a pattern detector configured to obtain a paging block repetition pattern for each of the networks, and a conflict manager configured to select the network to listen to when paging blocks from different networks collide. The conflict manager selects the network based on the paging block repetition patterns to minimize the probability of loss of a paging message associated to the paging blocks by predicting the next paging block transmissions.

20 Claims, 3 Drawing Sheets

PAGING READING CONFLICT MANAGEMENT IN DUAL STANDBY HANDSETS

FIELD OF THE INVENTION

The invention relates to the field of wireless handsets able to handle two network connections.

BACKGROUND OF THE INVENTION

By wireless handset, it is meant a cellular phone using radio waves to enable a party to make phone calls to another party. There are various well-known cellular communication technologies. The GSM (Global System for Mobile communications) system which uses time division multiple access technology and the UMTS (Universal Mobile Telecommunications System) which uses code division multiple access technology are two examples of such technologies.

With the advanced development of wireless communication technologies, it is now possible to support multiple wireless communication subscriptions using different or the same communication technologies in one communication apparatus.

In some handsets able to handle two communications, the same baseband and radiofrequency circuitry is used to access two independent cellular networks. Therefore, there is a general problem of management of this unique resource when both cellular networks need to establish a communication with the handset at the same time.

Particularly, when the handset is in idle mode, it needs to listen regularly to the networks to be informed of any incoming call. However, as the timing of each network may be totally independent, a conflict occurs when the handset has to listen to both networks at the same time. In this situation, the handset may miss an incoming call.

Technically speaking, the handset in idle mode can be reached by the network via the Paging Channel (PCH). The handset regularly (i.e. periodically) monitors the PCH. Meanwhile, the monitoring moments are referred to as paging occasions. In GSM or UMTS, the handset, also known as the mobile station (MS) or the user equipment (UE), may use discontinuous reception (DRX) during the idle mode to reduce power consumption. When DRX is used, the base station, i.e. the network, may transmit the paging messages periodically at the paging occasions and thus, the handset can receive the paging messages carried in the paging channel (PCH) burst at the paging occasions. The paging occasion defines the time for the handset to wake up and receive the PCH burst. After receiving the paging message, the handset may decide whether or not to sleep again by checking a flag (for instance, the "Page Indicator (PI)" in UMTS or the "MS Identity IE" in GSM) in the paging message. If the flag reveals that the handset is now being paged, the handset may initiate a process to receive the incoming call. Otherwise the handset may decide to sleep again and wake up at its next paging occasion.

When the radio transceiver module of a handset is shared between two identity cards, i.e. two network subscriptions, the handset may monitor only one wireless network for a specific time interval. As a result, listening to a paging message for one accessible wireless network during a wake-up time slot, i.e. paging occasion, may hinder listening for another accessible wireless network. Paging collisions occur when at least two paging occasions corresponding to different wireless networks respectively are present in the substantially same wake-up time slot (e.g. overlapping or identical time slots).

The patent application US 2009/0215473 discloses a communication apparatus in which a first subscriber identity card camps on a first cell and a second subscriber identity card camps on a second cell. A processor obtains information regarding first paging occasions distributed within a predetermined time interval for the first subscriber identity card, obtains information regarding second paging occasions distributed within the predetermined time interval for the second subscriber identity card, detects a forthcoming time slot of the predetermined time interval in which one of the first paging occasions collides with one of the second paging occasions, determines listening to one of the first cell and the second cell in the detected time slot, and notifies of the determination to the radio transceiver module so as to direct the radio transceiver module to listen to the determined cell to receive a corresponding paging message from the determined cell in the detected time slot.

SUMMARY OF THE INVENTION

There is a need to find alternative and/or better conflict management algorithms which will preferably be able to reduce the overall rate of paging message lost. It will also be advantageous to define a conflict management method which reduces the wake-up time of the handset.

In a first aspect of the invention a wireless communication apparatus adapted to transmit data via a first cell belonging to a first wireless network and a second cell belonging to a second wireless network, comprises:
  a radio transceiver module;
  a first interface to a first subscriber identity card camping on the first cell,
  a second interface to a second subscriber identity card camping on the second cell; and
  a processor coupled to the radio transceiver module, the first and the second interfaces The processor comprises
  a driver of the radio transceiver module configured to choose one network that the radio transceiver module should listen to; and
  a pattern detector configured to obtain, for each of the first and second networks, a paging block repetition pattern for paging blocks assigned to the apparatus; and
  a conflict manager configured to select the network to listen when a paging block of the first network collides with a paging block of the second network. The conflict manager is configured to select the network based on the obtained paging block repetition patterns to minimize the loose of a paging message associated to the paging blocks by predicting the next paging block transmissions.

Therefore the apparatus may advantageously reduce the overall rate of paging message lost.

In some embodiments,
  each network signal a calls for the apparatus by applying a pattern assigned to the apparatus on at least two paging blocks. The delays between two consecutive paging blocks on which the pattern is applied are predetermined, specific to each network and forming a repetition pattern. The pattern detector detects, for each network, the delays. On some network, a call for the apparatus is generated by applying a pattern assigned to the apparatus on three paging blocks. The apparatus may advantageously knows when the next paging blocks will happen and predicts thus their transmission.

the apparatus may request a dummy service inducing an answer and, upon reception of the paging blocks, determine and save the predetermined delays without answering to the network. Therefore, the apparatus is not obliged to wait for a call for knowing the repetition pattern. However, the apparatus may also verify the paging block repetition pattern by postponing answering to a network call to the apparatus until the last paging block assigned to the apparatus is received.

the conflict manager selects the network for which a current paging block has a highest priority and/or when two conflicting paging blocks have the same priority, the conflict manager selects a network that differs from the previous selected network. These rules have the advantage to select the network which has the higher risk to have the call not answered if it is not selected.

In a second aspect of the invention a method of selecting a network for a wireless communication apparatus transmitting data via a first cell belonging to a first wireless network and a second cell belonging to a second wireless network as disclosed here above comprises:

obtaining, for each network, a paging block repetition pattern for paging blocks assigned to the apparatus;

listening when a paging block of the first network collides with a paging block of the second network; and selecting the network based on the obtained paging block repetition patterns to minimize the loose of a paging message associated to the paging blocks by predicting the next paging block transmissions.

In a third aspect of the invention, a computer program product comprises program instructions to implement any of the method steps of the here above method when loaded and run on computer means of a wireless communication apparatus.

Some embodiments of the apparatus are also applicable for the method.

Depending on the type of handset and/or network, a particular embodiment may be preferred as easier to adapt or as giving a better result. Aspects of these particular embodiments may be combined or modified as appropriate or desired, however.

BRIEF DESCRIPTION OF THE DRAWINGS

These and other aspects of the invention will be apparent from and elucidated with reference to the embodiment described hereafter where.

DETAILED DESCRIPTION

Figure 1:
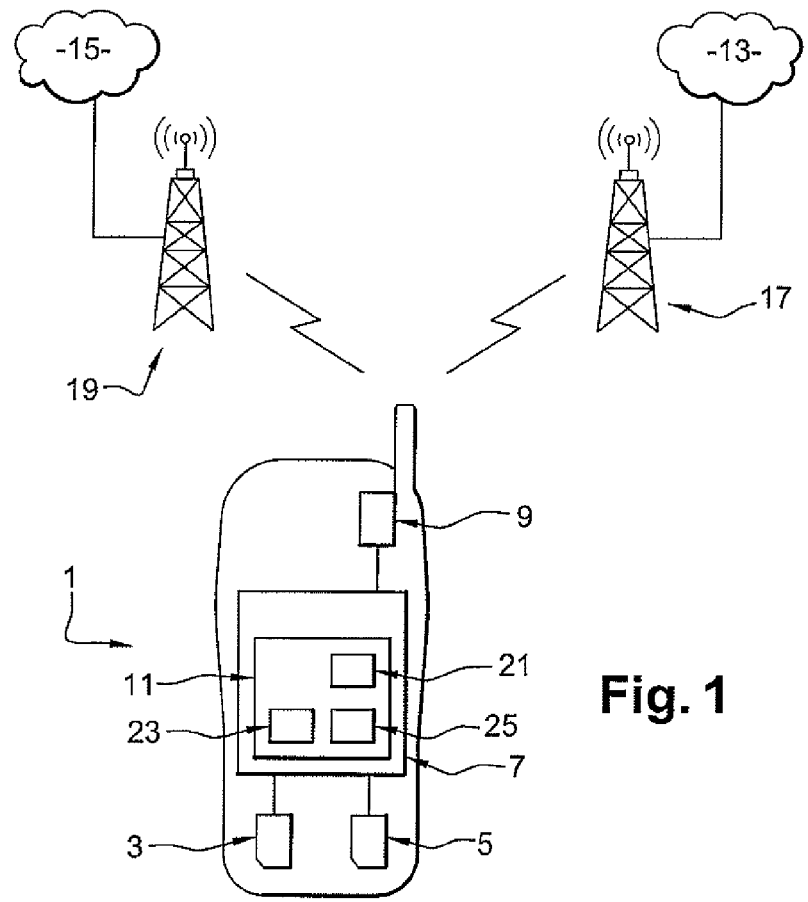
FIG. 1 is a schematic view of an example network topology according to some embodiments of the invention.

In reference to FIG. 1, a wireless communication apparatus 1, hereafter called a handset, comprises two subscriber identity cards 3 and 5, e.g. SIM cards, a baseband module 7, and a radio transceiver module 9, wherein the baseband module 7 is coupled to the subscriber identity cards 3, 5 and the radio transceiver module 9. The radio transceiver module 9 receives wireless radio frequency signals, converts the received signals to baseband signals to be processed by the baseband module 7, or receives baseband signals from the baseband module 7 and converts the received signals to wireless radio frequency signals to be transmitted to a peer device. The baseband module 7 further comprises a processor 11 for controlling the operation of the subscriber identity cards 3, 5 and the radio transceiver module 9.

The handset 1 may simultaneously access more than one core network such as the networks 13, 15. The networks 13, 15 use, for instance, 3GPP technology. The handset 1 may make a voice or data call to a party through the networks via base stations 17, 19.

The processor 11 comprises a driver 21 of the radio transceiver module 9 configured to choose one network that the radio transceiver module should listen to.

Therefore, the networks use paging blocks to inform the handset 1 of the incoming of a call.

Figure 2:
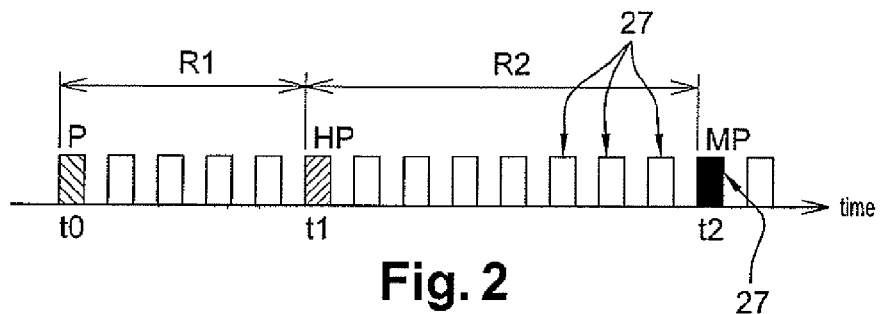
FIG. 2 is an example distribution of paging blocks along a time axis.

FIG. 2 illustrates a time series of paging blocks emitted by a base station.

Every DRX period, a paging block 27 is sent. However all paging blocks do not concern the handset 1. Only paging blocks containing a paging indicator relative the handset are signaling to the handset that a call is waiting.

These paging blocks are drawn in striped and black in FIG. 2.

Typically, each network signals a call for the handset 1 by sending a pattern of, for instance, three paging blocks P, HP and MP assigned to the handset 1, the second paging block HP being sent a first predetermined delay R1 after the first paging block P and the third paging block MP being sent a second predetermined delay R2 after the second paging block HP. The first and second predetermined delays R1, R2 may be specific to each network.

Thus the processor 7 of the handset of FIG. 1 comprises also a pattern detector 23 configured to obtain, for each of the first and second networks 13, 15, a paging block repetition pattern for paging blocks assigned to the apparatus; and a conflict manager 25 configured to select the network to listen when a paging block of the first network collides with a paging block of the second network. The conflict manager is configured to select the network based on the obtained paging block repetition patterns to minimize the loose of a communication call associated to the paging blocks by predicting the next paging block transmissions.

As explained in the preamble, the handset 1 may use discontinuous reception (DRX) during the idle mode to reduce power consumption.

Figure 3:
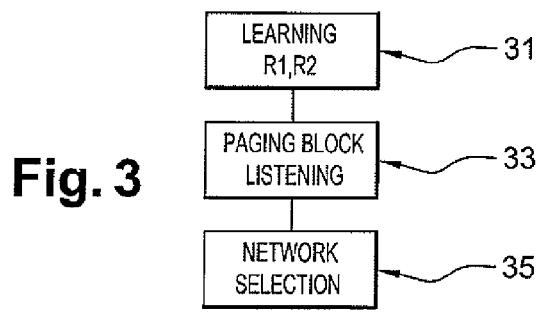
FIG. 3 is a flow chart of a method to solve a paging block conflict according to some embodiments of the invention.

To manage a paging block conflict, FIG. 3, the handset 1 starts by a learning phase, step 31, to learn the paging repetition pattern applied by each network where the handset 1 camps on. Then, step 33, it listens when a paging block of the first network collides with a paging block of the second network. It selects, step 35, the network based on the obtained paging block repetition patterns to minimize the loose of a paging message associated to the paging blocks by predicting the next paging block transmissions.

The learning phase consists in detecting the first and second predetermined delays R1, R2.

One way for the handset to be able to detect and store the paging transmission sequence is to force the network to send paging blocks, also called paging messages, assigned to the handset 1.

In an initial phase after a switch on, the handset 1 may request a dummy service (e.g. via SMS) which induces an answer. Upon the reception of the paging blocks, the handset executes the following steps:
- If the paging message is assigned to the handset, save its reception time and do not answer to the network;
- Repeat the above action upon reception of the second and third paging blocks.

Therefore, as depicted in FIG. 2, the handset will store the predetermined delays R1, R2, also called paging distances, describing the repetition pattern applied by the network.

This learning phase may be executed on both networks. Until the learning phase is completed on both networks, the handset may toggle the listening between networks on each conflict occurrence.

During operation, the network repetition pattern may be reconfirmed or updated. For that, the handset 1 may repeat the learning procedure e.g. periodically and/or at the time of an incoming call. The handset 1 may save the R1, R2 delays and postpone answering the call until the third paging block MT.

Figure 4:
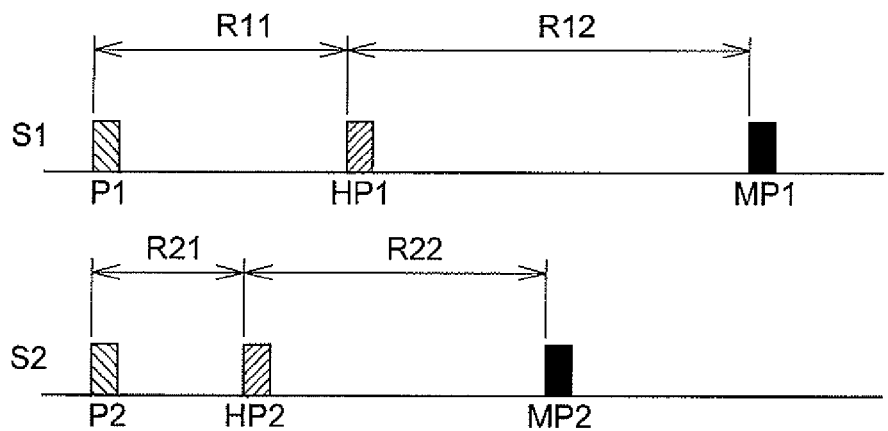
FIGS. 4 to 9 are examples of conflict management according to some embodiments of the invention.

As shown in FIG. 4, after the learning phase, the handset 1 has stored the paging repetition pattern for both networks S1, S2.
- For S1, the pattern is the repetition factors R11, R12;
- For S2, the pattern is the repetition factors R21, R22.

To manage the paging block reading conflict between both networks, the stored repetition patterns are used to predict the next paging transmission assigned to the handset 1.

Some generic rules may be applied:
- Second paging blocks HPx take priority over first paging blocks Px (rule 1). Thus, HPx has higher rank than Px; and
- Third paging blocks MPx take priority over second paging blocks HPx, and therefore, first paging blocks Px (rule 2). Thus MPx is higher ranked than HPx.
- In case of conflict between paging blocks with same priority, or same rank, a toggle compared to the previous selection may be applied (rule 3).
- In case of conflict between next to last paging block repetition, an additional check is done to ensure that the last paging block repetition will not be in conflict and thus will be correctly received.

A paging block of higher rank has thus priority over a paging block of lower rank.

Now some examples are given to illustrate a conflict management according to the disclosed rules.

Figure 5:
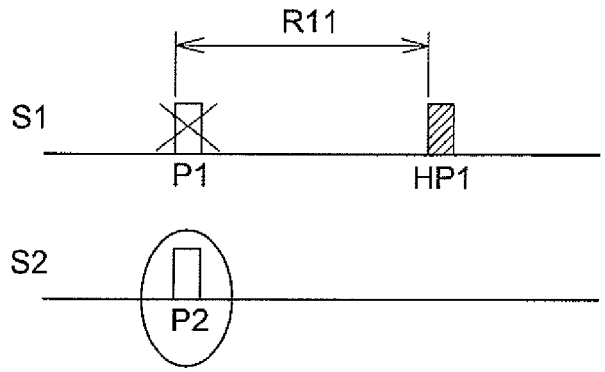

FIG. 5 illustrates a conflict between two paging blocks S1(P1) and S2(P2) of same priority. A toggle compared to the previous selection is applied (rule 3) and S2(P2) is selected.

Then S1 paging assignment is predicted with the second paging block HP1: S1(HP1)=S1(P1+R11).

Figure 6:
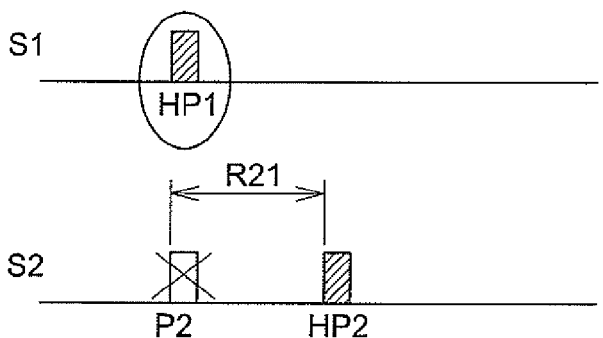

FIG. 6 illustrates a conflict between two paging blocks S1(HP1) and S2(P2) of different priority. According to rule 1, S1(HP1) takes priority over S2(P2) then S1(HP1) is selected. Next, S2 paging assignment is predicted: S2(HP2)=S2(P2+R21).

Figure 7:
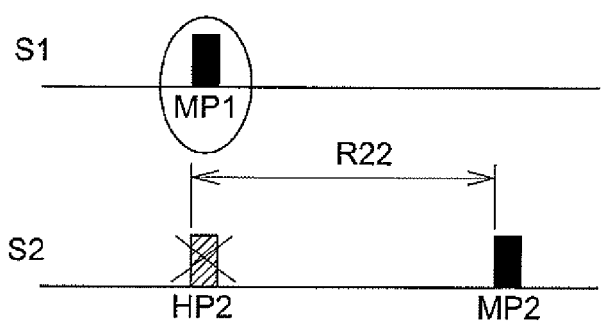

FIG. 7 illustrates a conflict between two paging blocks S1(MP1) and S2(HP2) of different priority. According to rule 2, S1(MP1) takes priority over S2(HP2) then S1(MP1) is selected. Next, S2 paging assignment is predicted: S2(MP2)=S2(HP2+R22).

Figure 8:
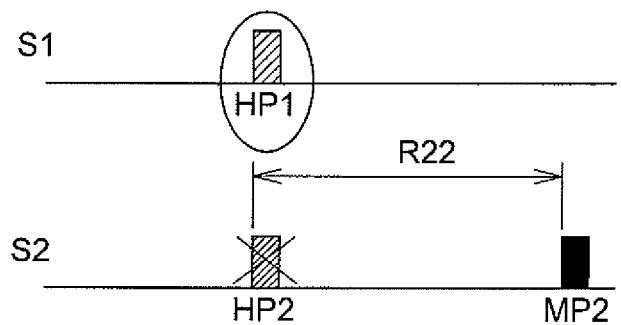

FIG. 8 illustrates a conflict between two paging blocks S1(HP1) and S2(HP2) of same priority. A toggle compared to the previous selection is applied (rule 3). By application of rule 4, knowing the different delays between paging blocks, it can be predicted that S2(HP2+R22), i.e. S2(MP2) has no conflict with a S1(MP1), i.e. S1(HP1+R12), as R22 is different from R12, then S1(HP1) is selected.

Then S2 paging assignment is predicted with the third paging block MP2: S2(MP2)=S2(HP2+R22).

Figure 9:
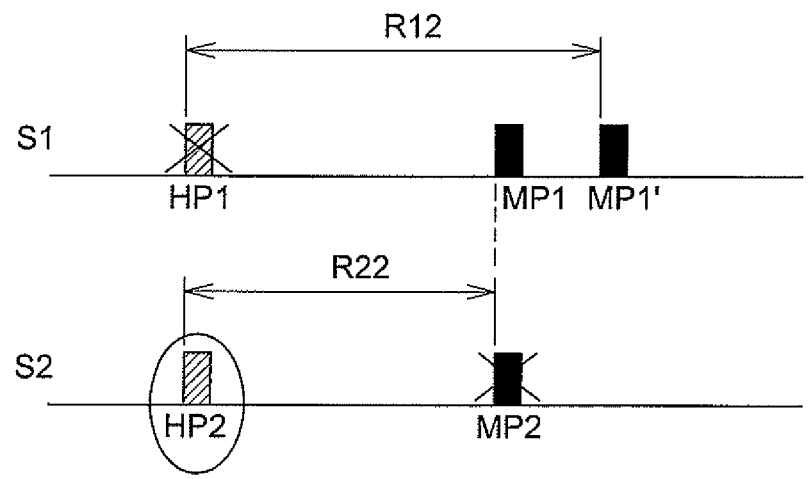

FIG. 9 illustrates a conflict between two paging blocks S1(HP1) and S2(HP2) of same priority. A toggle compared to the previous selection is applied (rule 3). S2(HP2+R22) has a conflict with a S1(MP1) (rule 4) which should already been predicted as the delays between HP1 and MP1, respectively, HP2 and MP2, are known to be identical, then S2(HP2) is selected.

Then S1 paging assignment is predicted with the third paging block MP1': S1(MP1')=S1(HP1+R12).

The method may be implemented by a computer program product that is able to implement any of the method steps as described above when loaded and run on computer means of a wireless communication apparatus. The computer program may be stored/distributed on a suitable medium supplied together with or as a part of other hardware, but may also be distributed in other forms, such as via the Internet or other wired or wireless telecommunication systems.

An integrated circuit may be arranged to perform any of the method steps in accordance with the disclosed embodiments.

While the invention has been illustrated and described in details in the drawings and foregoing description, such illustration and description are to be considered illustrative or exemplary and not restrictive; the invention is not limited to the disclosed embodiment.

Particularly, embodiments are disclosed in the context of accessing two different networks from a handset. However, it should be emphasized that the disclosed embodiments are also applicable in handsets with two, or more, subscription cards belonging to the same network.

Furthermore, the description is disclosing embodiments using the example of two subscription identity cards. However, the disclosed embodiments are also applicable where a handset comprises three or more subscription identity cards.

Other variations to the disclosed embodiments can be understood and effected by those skilled on the art in practicing the claimed invention, from a study of the drawings, the disclosure and the appended claims. In the claims, the word "comprising" does not exclude other elements and the indefinite article "a" or "an" does not exclude a plurality.

The invention claimed is:

1. A wireless communication apparatus configured to receive and transmit data via a first cell belonging to a first wireless network and a second cell belonging to a second wireless network, the apparatus comprising:
- a radio transceiver module;
- a first interface for a first subscriber identity card camping on the first cell;
- a second interface for a second subscriber identity card camping on the second cell;
- a processor coupled to the radio transceiver module, the first and the second interfaces and including
- a driver of the radio transceiver module configured to choose the first or the second wireless network to which the radio transceiver module should listen to;
- a pattern detector configured to obtain, for each of the first and second wireless networks, a paging block repetition pattern for paging blocks assigned to the apparatus; and
- a conflict manager configured to select the first or the second wireless network to listen to when a paging block of the first wireless network collides with a paging block of the second wireless network, wherein the conflict manager is configured to select the first or the second wireless network based on the paging block repetition patterns to minimize a probability of loss of a paging message associated to the paging blocks by predicting next paging block transmissions, wherein each of the first and second wireless networks is configured to signal a call for the apparatus by applying a pattern assigned to the apparatus on at least two paging blocks, delays between two consecutive paging blocks on which the pattern is applied being predetermined and specific to each of the first and second wireless network and forming a repetition pattern, and wherein the pattern detector is configured to detect, for each of the first and the second network, the predetermined delays, and wherein the apparatus is configured to
request a dummy service inducing an answer and, upon reception of the paging blocks, to determine and save the predetermined delays without answering to the first or second wireless network, or verify the paging block repetition pattern by postponing answering to a network call to the apparatus until a last paging block assigned to the apparatus is received.

2. The apparatus according to claim 1, wherein each of the first and second network is configured to signal the call for the apparatus by applying the pattern assigned to the apparatus on three paging blocks.

3. The apparatus according to claim 1, wherein the conflict manager selects the first or second wireless network for which a current paging block has a highest priority.

4. The apparatus according to claim 3, wherein when two conflicting paging blocks have the same priority, the conflict manager selects a network that differs from a previous selected network.

5. The apparatus according to claim 1, wherein the first wireless network is the same network as the second wireless network.

6. A wireless communication device comprising an apparatus according to claim 1, a first subscriber identity card and a second subscriber identity card.

7. The apparatus according to claim 1, wherein a second of the two consecutive paging blocks takes priority over a first one of the two consecutive paging blocks, wherein when the paging block of the first wireless network collides with the paging block of the second wireless network the conflict manager is configured to select a paging block of the first or second wireless network based on whether the collided paging blocks are the first or the second one of the two consecutive paging blocks.

8. A method for selecting a network by a wireless communication apparatus receiving and transmitting data via a first cell belonging to a first wireless network and a second cell belonging to a second wireless network, the apparatus including:
a radio transceiver module;
a first interface for a first subscriber identity card camping on the first cell;
a second interface for a second subscriber identity card camping on the second cell;
a processor coupled to the radio transceiver module, the first and the second interfaces;
said method comprising:
obtaining, for each of the first and second wireless network, a paging block repetition pattern for paging blocks assigned to the apparatus;

listening when a paging block of the first wireless network collides with a paging block of the second wireless network; and selecting the first or the second wireless network based on the paging block repetition patterns to minimize a probability of loss of a paging message associated to the paging blocks by predicting next paging block transmissions, wherein each of the first and second wireless networks is configured to signal a call for the apparatus by applying a pattern assigned to the apparatus on at least two paging blocks, delays between two consecutive paging blocks on which the pattern is applied being predetermined and specific to each of the first and second wireless network and forming a repetition pattern, and the method further includes detecting the delays to obtain the paging block repetition pattern, for each network, wherein the method further comprises
detecting the predetermined delays using a dummy service that requests an answer and determining and saving the predetermined delays upon receiving the paging blacks without answering to the network, or verifying the paging block repetition pattern by postponing answering to a network call to the apparatus until a last paging block assigned to the apparatus is received.

9. The method according to claim 8, wherein a second of the two consecutive paging blocks takes priority over a first one of the two consecutive paging blocks, wherein when the paging block of the first wireless network collides with the paging block of the second wireless network the a paging block of the first or second wireless network is selected based on whether the collided paging blocks are the first or the second one of the two consecutive paging blocks.

10. The method according to claim 8, further comprising selecting the first or second wireless network for which a current paging block has a highest priority.

11. The method according to claim 10, wherein when two conflicting paging blocks have the same priority, a network that differs from a previous selected network is selected.

12. A non-transitory computer readable medium storing a computer program comprising program instructions for selecting a network by a wireless communication apparatus receiving and transmitting data via a first cell belonging to a first wireless network and a second cell belonging to a second wireless network, the apparatus including:
a radio transceiver module;
a first interface for a first subscriber identity card camping on the first cell;
a second interface for a second subscriber identity card camping on the second cell;
a processor coupled to the radio transceiver module, the first and the second interfaces;
wherein execution of the program instructions by the processor causes the processor to:
obtain, for each of the first and second wireless network, a paging block repetition pattern for paging blocks assigned to the apparatus;
listen when a paging block of the first wireless network collides with a paging block of the second wireless network; and
select the first or the second wireless network based on the paging block repetition patterns to minimize a probability of loss of a paging message associated to the paging blocks by predicting next paging block transmissions, wherein each of the first and second wireless networks is configured to signal a call for the apparatus by applying a pattern assigned to the apparatus on at least two paging blocks, delays between two consecutive paging blocks on which the pattern is applied being predetermined and specific to each of the first and second wireless network and forming a repetition pattern, and the method further includes detecting the delays to obtain the paging block repetition pattern, for each network, wherein the execution of the program instructions by the processor further causes the processor to detect the predetermined delays using a dummy service that requests an answer and determining and saving the predetermined delays upon receiving the paging blacks without answering to the network, or verify the paging block repetition pattern by postponing answering to a network call to the apparatus until a last paging block assigned to the apparatus is received.

13. The non-transitory computer readable medium according to claim 12, wherein a second of the two consecutive paging blocks takes priority over a first one of the two consecutive paging blocks, wherein when the paging block of the first wireless network collides with the paging block of the second wireless network a paging block of the first or second wireless network is selected based on whether the collided paging blocks are the first or the second one of the two consecutive paging blocks.

14. The non-transitory computer readable medium according to claim 12, wherein the execution of the program instructions by the processor further causes the processor to select the first or second wireless network for which a current paging block has a highest priority.

15. The non-transitory computer readable medium according to claim 14, wherein when two conflicting paging blocks have the same priority, a network that differs from a previous selected network is selected.

16. A processor for a wireless communication apparatus configured to receive and transmit data via a first cell belonging to a first wireless network and a second cell belonging to a second wireless network, the processor being connectable to:

a radio transceiver module;

a first interface for a first subscriber identity card camping on the first cell;

a second interface for a second subscriber identity card camping on the second cell;

the processor comprising:

a driver of the radio transceiver module configured to choose the first or the second wireless network that the radio transceiver module should listen to;

a pattern detector configured to obtain, for each of the first and second wireless networks, a paging block repetition pattern for paging blocks assigned to the apparatus; and a conflict manager configured to select the first or the second wireless network to listen to when a paging block of the first network collides with a paging block of the second network, wherein the conflict manager is configured to select the first or the second wireless network based on the paging block repetition patterns to minimize a probability of loss of a paging message associated to the paging blocks by predicting a next paging block transmissions, wherein each of the first and second wireless networks is configured to signal a call for the apparatus by applying a pattern assigned to the apparatus on at least two paging blocks, delays between two consecutive paging blocks on which the pattern is applied being predetermined and specific to each of the first and second wireless network and forming a repetition pattern, and wherein the pattern detector is configured to detect, for each of the first and the second network, the predetermined delays, and wherein the processor is configured to request a dummy service inducing an answer and, upon reception of the paging blocks, to determine and save the predetermined delays without answering to the first or second wireless network, or verify the paging block repetition pattern by postponing answering to a network call to the apparatus until a last paging block assigned to the apparatus is received.

17. The processor according to claim 16, wherein a second of the two consecutive paging blocks takes priority over a first one of the two consecutive paging blocks, wherein when the paging block of the first wireless network collides with the paging block of the second wireless network the conflict manager is configured to select a paging block of the first or second wireless network based on whether the collided paging blocks are the first or the second one of the two consecutive paging blocks.

18. The processor to claim 16, wherein the conflict manager selects the first or second wireless network for which a current paging block has a highest priority.

19. The processor according to claim 18, wherein when two conflicting paging blocks have the same priority, the conflict manager selects a network that differs from a previous selected network.

20. A method for selecting a network by a wireless communication apparatus receiving and transmitting data via a first cell belonging to a first wireless network and a second cell belonging to a second wireless network, the method comprising:

obtaining, for each of the first and second wireless network, a paging block repetition pattern for paging blocks assigned to the apparatus, wherein the assigned paging block repetition pattern includes three assigned paging blocks, a second paging block being sent a first predetermined delay after a first paging block and a third paging block being sent a second predetermined delay after the second paging block, and wherein the first and second predetermined delays are different;

listening when a paging block of the first wireless network collides with a paging block of the second wireless network and when the paging block of the first network collides with the paging block of the second network;

predicting a next paging block transmissions for each of the first and second wireless network using the obtained paging block repetition for each of the first and second wireless network defined by the first and second predetermined delays;

selecting one of the first and second wireless network to listen to based on the prediction of the next paging block transmissions, wherein the paging block repetition pattern is obtained by using a dummy service that requests an answer and determining and saving the predetermined delays upon receiving the paging blacks without answering to the network, or postponing answering to a network call to the apparatus until a last paging block assigned to the apparatus is received.

* * * * *